United States Patent
Lei et al.

(10) Patent No.: US 10,645,550 B2
(45) Date of Patent: May 5, 2020

(54) UPLINK CONTROL PLANE SIGNALING PROCESSING METHOD AND DEVICE FOR V2X SERVICES, AND TERMINAL

(71) Applicant: Yulong Computer Telecommunication Scientific (Shenzhen) Co., Ltd., Shenzhen (CN)

(72) Inventors: Yixue Lei, Shenzhen (CN); Yunfei Zhang, Shenzhen (CN)

(73) Assignee: Yulong Computer Telecommunication Scientific (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/070,266

(22) PCT Filed: Jul. 31, 2016

(86) PCT No.: PCT/CN2016/092536
§ 371 (c)(1),
(2) Date: Jul. 13, 2018

(87) PCT Pub. No.: WO2017/121098
PCT Pub. Date: Jul. 20, 2017

(65) Prior Publication Data
US 2019/0014523 A1 Jan. 10, 2019

(30) Foreign Application Priority Data
Jan. 15, 2016 (CN) .......................... 2016 1 0029373

(51) Int. Cl.
*H04W 4/40* (2018.01)
*H04W 4/029* (2018.01)
(Continued)

(52) U.S. Cl.
CPC ............. *H04W 4/40* (2018.02); *H04W 4/029* (2018.02); *H04W 4/20* (2013.01); *H04W 36/32* (2013.01);
(Continued)

(58) Field of Classification Search
None
See application file for complete search history.

(56) References Cited

U.S. PATENT DOCUMENTS

2015/0282210 A1* 10/2015 Li ........................ H04W 76/14
455/436
2015/0334554 A1* 11/2015 Song ...................... H04W 4/70
455/558
(Continued)

FOREIGN PATENT DOCUMENTS

| CN | 102209345 A | 10/2011 |
|---|---|---|
| CN | 103200526 A | 7/2013 |

(Continued)

OTHER PUBLICATIONS

International Search Report for International Application No. PCT/CN2016/092536, dated Nov. 3, 2016.
(Continued)

*Primary Examiner* — Asad M Nawaz
*Assistant Examiner* — Najeeb Ansari
(74) *Attorney, Agent, or Firm* — Wolf, Greenfield & Sacks, P.C.

(57) ABSTRACT

An uplink control plane signaling processing method and device for V2X services and a terminal are provided. When a base station indicates an uplink signaling reduction mechanism in first RRC signaling or second RRC signaling, a UE enables the uplink signaling reduction mechanism. The UE selects, based on macro cell uplink resources, to camp on a macro cell or to access a small cell controlled by a plurality
(Continued)

of RSUs. The UE reports current location information through an X2 interface between the RSUs and an X2 interface between the RSU and the base station. The first RRC signaling is used for sending system information in system information broadcast.

15 Claims, 5 Drawing Sheets

(51) Int. Cl.
*H04W 4/20* (2018.01)
*H04W 76/10* (2018.01)
*H04W 36/32* (2009.01)
*H04W 72/12* (2009.01)

(52) U.S. Cl.
CPC ....... *H04W 72/1284* (2013.01); *H04W 76/10* (2018.02)

(56) References Cited

U.S. PATENT DOCUMENTS

| | | | |
|---|---|---|---|
| 2018/0077668 A1* | 3/2018 | Chun | H04W 4/00 |
| 2018/0191551 A1* | 7/2018 | Chun | H04W 76/27 |
| 2018/0255558 A1* | 9/2018 | Lee | H04W 72/10 |
| 2018/0279095 A1* | 9/2018 | Xu | H04W 76/12 |

FOREIGN PATENT DOCUMENTS

| | | |
|---|---|---|
| CN | 104637328 A | 5/2015 |
| CN | 105704812 A | 6/2016 |
| WO | WO 2014/036891 A1 | 3/2014 |

OTHER PUBLICATIONS

Written Opinion for International Application No. PCT/CN2016/092536, dated Nov. 3, 2016.

* cited by examiner

UPLINK CONTROL PLANE SIGNALING PROCESSING METHOD AND DEVICE FOR V2X SERVICES, AND TERMINAL

CROSS-REFERENCES TO RELATED APPLICATIONS

This application is a national stage application under U.S.C. § 371 of PCT International Application No. PCT/CN2016/092536, filed Jul. 31, 2016, entitled "Uplink Control Plane Signaling Processing Method and Device For V2X Services, and Terminal", which claims foreign priority benefits under 35 U.S.C. § 119(a)-(d) or 35 U.S.C. § 365(b) of Chinese Patent Application No. 201610029373.0, entitled "Uplink Control Plane Signaling Processing Method and Device For V2X Services, and Terminal" and filed to the State Intellectual Property Office on Jan. 15, 2016, the entire contents of each of which are incorporated herein by reference in their entirety.

TECHNICAL FIELD

The present disclosure relates to the field of communication technologies, for example, to an uplink control plane signaling processing method and apparatus for Vehicle to X (V2X) services, and a terminal.

BACKGROUND

To achieve information exchange between vehicles and the outside world, a communication project of Vehicle to X (V2X) focused on studying transmission schemes of vehicle data based on the 3rd Generation Partnership Project (3GPP) communication protocol is approved to be established in 3GPP RAN #68. This project includes a Vehicle-to-Vehicle (V2V) communication project, a Vehicle to Pedestrian (V2P) communication project, and a Vehicle to Infrastructure (V2I) communication project, etc. V2V may be implemented through a Uu interface and a PC5 interface. A V2V communication mechanism based on PC5/D2D, the V2V may not occupy macro network radio bearer resources in a user plane data transmission process, and may naturally achieve spatial division multiplexing. Therefore, the V2V communication mechanism based on PC5/D2D is regarded as a LTE-based V2V mainstream technology.

In the 3GPP TSG RAN1 #83 discussion, it was mentioned that a base station can schedule a sidelink (SL) transmission based on a current location of a user equipment (UE) such as a vehicle. In the process of scheduling by the base station based on the location of the user equipment, the UE continuously triggers a radio resource control (RRC) report message in order to let the base station learn the current location of the UE.

However, excessive occupancy of signaling radio bearer (SRB) resources may be caused if the UE frequently reports its current location to the base station through the RRC messages. For example, excessive occupancy of resources will become more and more apparent as the number of UEs increases and the frequency of reporting increases. In fact, excessive macro network resources also may be occupied, which increases the signaling overhead of the entire control plane, and causes a decrease in the overall utilization of the radio resources.

SUMMARY

Based on the above problems, the present disclosure provides an uplink control plane signaling processing method and device for V2X services, and a terminal, which can solve the problem of increasing control plane signaling overheads caused by frequently reporting RRC messages to a base station, such that an overall utilization of radio resources is increased.

In a first aspect, the present disclosure provides an uplink control plane signaling processing method for V2X services. The method is applicable to a terminal and includes:

receiving an uplink signaling reduction mechanism indicated by a base station in first radio resource control (RRC) signaling or second RRC signaling, wherein the first RRC signaling is used for sending system information in system information broadcast;

enabling the uplink signaling reduction mechanism;

selecting, based on macro cell uplink resources, to camp on a macro cell or to access a small cell controlled by a plurality of road side units (RSUs); and reporting current location information through an X2 interface between the plurality of RSUs and through an X2 interface between the RSU and the base station.

In this technical solution, alternatively, the method further includes:

selecting to establish an RRC connection with the macro cell or the small cell controlled by the RSUs based on a mobility state maintenance and a cell selection and handover function when the base station does not indicate the uplink signaling reduction mechanism in the first RRC signaling or the second RRC signaling.

In this technical solution, alternatively, when the UE is in an idle state, the base station plans a tracking area (TA) thereof, and each of the plurality of RSUs plans a TA thereof, such that a tracking area update (TAU) of the macro cell and a TAU of the plurality of RSUs are the same; and when a TA of the macro cell is different from TAs of the plurality of RSUs, the method further includes:

receiving, by the UE, a tracking area identifier list (TAI list) configured by the base station and the RSUs to the UE; where the TAI list of the UE comprises the TA configured by the base station to the macro cell and the TAs configured by the RSUs to the RSUs, and the TA of the macro cell is different from the TAs of the RSUs.

In this technical solution, alternatively, the method further includes:

reporting the current location information through an X2 interface between a first RSU and a second RSU when the UE is in a connected state and the UE switches between a road area covered by the first RSU and a road area covered by the second RSU.

In this technical solution, alternatively, the method further includes:

saving the current location information of the UE in the UE when the current location information of the UE is obtained under the first RSU;

reporting the current location information saved in the UE through the X2 interface between the first RSU and the second RSU when the UE establishes an RRC connection with the second RSU; or reporting the current location information saved in the UE through the X2 interface between the first RSU and the second RSU before the UE is disconnected from the first RSU; or broadcasting the current location information in a broadcast manner, wherein the first RSU and the second RSU are each configured with a PC5 interface, and after the current location information saved in the UE is received, the current location information is reported through the X2 interface between the RSU and the base station.

In this technical solution, alternatively, the method further includes:

reporting a cell identity (cell ID) of a previous RSU and/or a cell ID of a selected RSU to the base station through the X2 interface between the RSU and the base station when a global navigation satellite system (GNSS) of the UE or other positioning information is invalidated in a handoff process.

In a second aspect, the present disclosure further provides an uplink control plane signaling processing device for V2X services. The device includes: a receiving unit, an enabling unit, a selecting unit, and a reporting unit.

The receiving unit is configured to receive an uplink signaling reduction mechanism indicated in first radio resource control (RRC) signaling or second RRC signaling, wherein the first RRC signaling is used for sending system information in system information broadcast.

The enabling unit is configured to enable the uplink signaling reduction mechanism.

The selecting unit is configured to select, based on macro cell uplink resources, to camp on a macro cell or to access a small cell controlled by a plurality of road side units (RSUs).

The reporting unit is configured to report current location information through an X2 interface between the plurality of RSUs and through an X2 interface between the RSU and the base station.

In this technical solution, alternatively, when the UE is in an idle state, the base station plans a tracking area (TA) thereof, and each of the RSUs plans a TA thereof, such that a tracking area update (TAU) of the macro cell and a TAU of the plurality of RSUs are the same. When the TA of the macro cell is different from TAs of the RSUs, the receiving unit is configured to receive a tracking area identifier list (TAI list) configured by the base station and the plurality of RSUs to the UE, the TAI list of the UE comprises the TA configured by the base station to the macro cell and TAs configured by the RSUs to the RSUs, and the TA of the macro cell is different from the TAs of the RSUs.

In this technical solution, alternatively, when the UE is a UE in a connected state, the reporting unit includes:

a first reporting subunit, configured to report the current location information through the X2 interface between a first RSU and a second RSU when the UE switches between a road area covered by the first RSU and a road area covered by the second RSU.

In this technical solution, alternatively, the UE further includes:

a saving unit, configured to save the current location information of the UE in the UE when the current location information of the UE is obtained under the first RSU.

The reporting unit includes a second reporting subunit, configured to report the current location information saved in the UE through the X2 interface between the first RSU and the second RSU when the UE establishes an RRC connection with the second RSU.

Alternatively, the reporting unit includes a third reporting subunit, configured to the reporting unit comprises a third reporting subunit, configured to report the current location information saved in the UE through the X2 interface between the first RSU and the second RSU before the UE is disconnected from the first RSU.

Alternatively, the reporting unit includes a broadcasting subunit, configured to broadcast the current location information in a broadcast manner, wherein the first RSU and the second RSU are each configured with a PC5 interface, and after the current location information saved in the UE is received, the current location information is reported through the X2 interface between the RSU and the base station.

In this technical solution, alternatively, the reporting unit includes:

a fourth reporting subunit, configured to report a cell identity (cell ID) of a previous RSU and/or a cell ID of a selected RSU to the base station through the X2 interface between the RSU and the base station when a global navigation satellite system (GNSS) of the UE or other positioning information is invalidated in a handoff process.

In a third aspect, an embodiment of the present disclosure also provides a user equipment. The user equipment includes one or more processors, memories, and one or more programs. The memories store the above uplink control plane signaling processing device for V2X services.

In a fourth aspect, an embodiment of the present disclosure also provides a non-transitory computer readable storage medium, in which computer-executable instructions are stored. The computer-executable instructions may execute the uplink control plane signaling processing method for V2X services.

According to the technical solution of processing uplink control plane signaling for V2X services disclosed by the embodiments of the present disclosure, when the base station indicates an uplink signaling reduction mechanism in the RRC signaling or the second RRC signaling, the UE enables the uplink signaling reduction mechanism. The UE selects, based on macro cell uplink resources, to camp on a macro cell or to access a small cell controlled by a plurality of RSUs. The UE reports the current location information through the X2 interface between the RSUs and through the X2 interface between the RSU and the base station. The technical solution of the present disclosure introduces an uplink signaling reduction mechanism indicated by a base station, by way of enabling-disabling control of the base station on the uplink signaling reduction mechanism, when the base station indicates the uplink signaling reduction mechanism in the first RRC signaling or the second RRC signaling, the UE enables the uplink signaling reduction mechanism, such that the UE preferentially selects to camp on a macro cell or to access a small cell controlled by RSUs to save macro cell uplink resources, and offloads the uplink report signaling from an air interface by way of a collaboration between the RSUs and a collaboration between the RSU and the base station during a handoff process, and transfers the report signaling to a road side unit (RSU) layer, which does not occupy macro network resources and reduces control plane signaling overheads, and thus the objective of increasing the overall utilization of radio resources is achieved.

DETAILED DESCRIPTION

To more clearly understand the objectives, features and advantages of the present disclosure, related description of the present disclosure is made below with reference to the accompanying drawings and alternative embodiments. It is to be noted that the embodiments of the present disclosure and the features in the embodiments may be combined with each other on a non-conflict basis.

Many details are set forth in the following description to fully understand the present disclosure. However, the present disclosure also may be implemented by using other manners other than the embodiments described herein. Therefore, the scope of protection of the present disclosure is not limited by the embodiments disclosed in the following.

Figure 1:
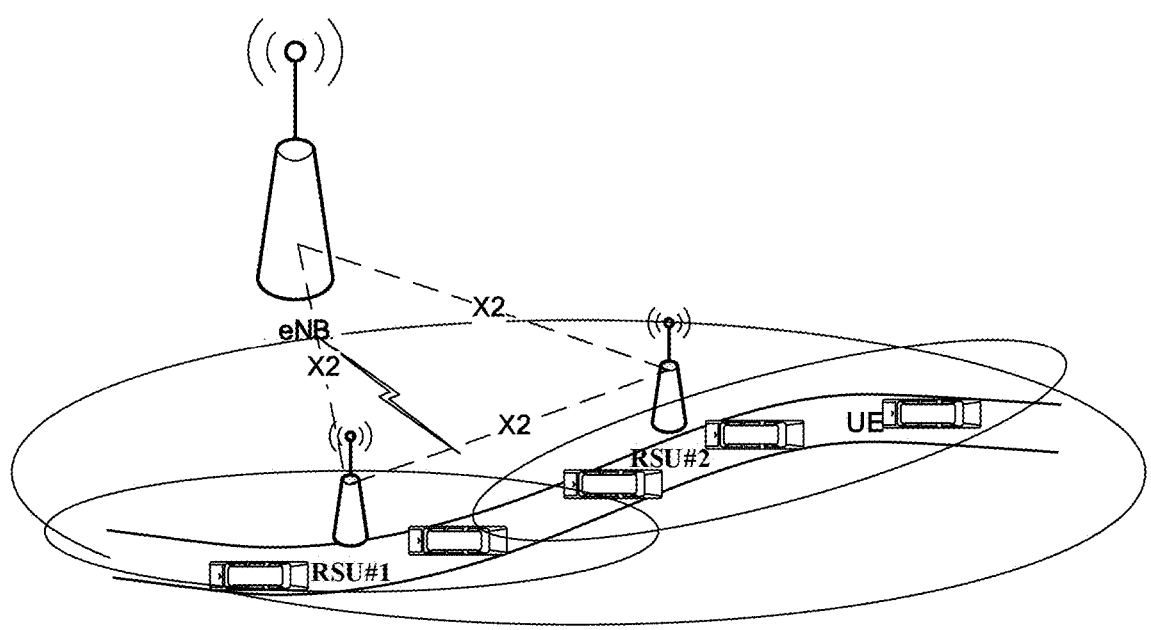
FIG. 1 illustrates a schematic diagram of an architecture between a base station and RSUs according to an embodiment of the present disclosure.

The present disclosure is based on the 3GPP TSG RAN2 standard and an architecture between a base station and RSUs as shown in FIG. 1. The architecture includes: the base station eNB, the RSU #1, the RSU #2, and a UE. An X2 interface exists between the RSU #1 and the RSU #2. An X2 interface exists between the RSU #1 and the base station eNB. An X2 interface exists between the RSU #2 and the base station eNB. The X2 interface is based on a backhaul line whose transmission characteristics are ideal. The technical solution disclosed by the embodiments of the present disclosure introduces a enabling-disabling control on the uplink signaling reduction mechanism by the base station, which is applicable to different scenarios in uplink resource configuration. By way of a collaboration between the RSUs and collaboration between the RSUs and the base station, the technical solution can solve the problem of signaling overhead caused by occupancy of macro network resources by location information reporting information of the UE such as a vehicle. Related description may be made with reference to the following embodiments.

Embodiment I

Figure 2:
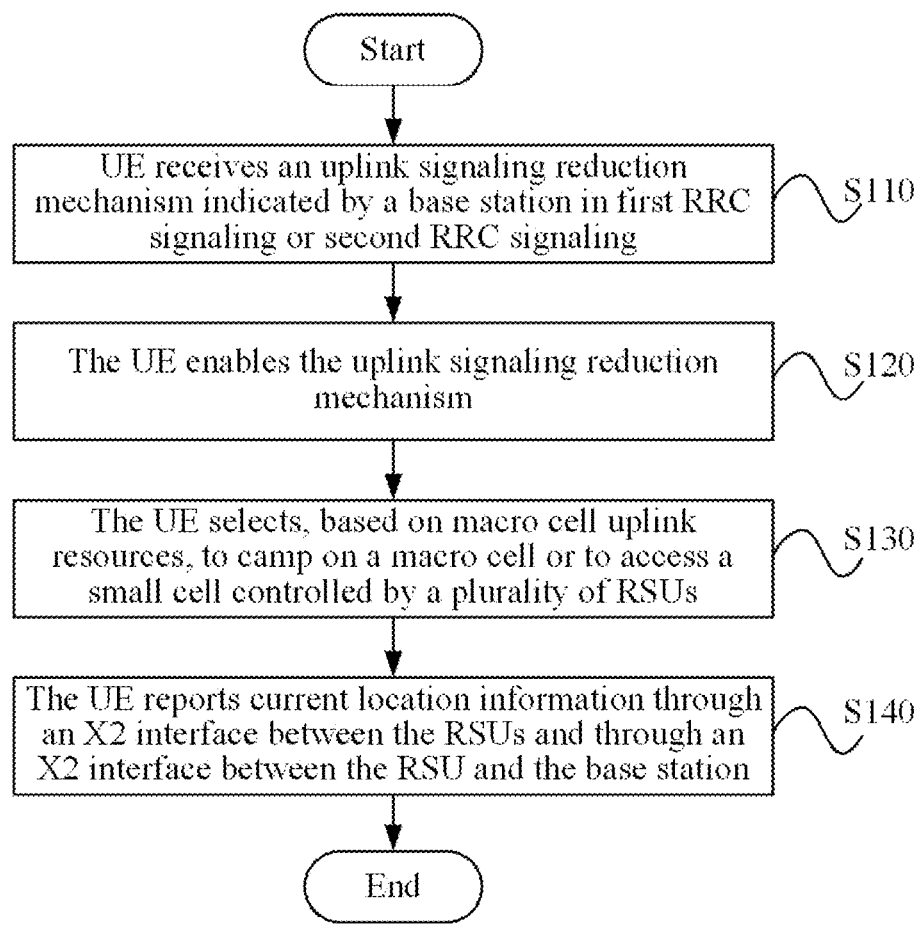
FIG. 2 illustrates a schematic flow diagram of an uplink control plane signaling processing method for Vehicle to V2X services according to Embodiment I of the present disclosure.

As shown in FIG. 2, which is a schematic flowchart of a method for processing uplink control plane signaling for V2X services according to Embodiment I of the present disclosure, the method is applicable to a UE and includes the following steps.

In Step S110, the UE receives an uplink signaling reduction mechanism indicated by a base station in system information broadcast or other radio resource control (RRC) signaling.

System information in the system information broadcast may include one master information block (MIB) and a plurality of system information blocks (SIBs). The SIBs are sent via the RRC signaling of a physical downlink shared channel (PDSCH).

In Step S120, the UE enables the uplink signaling reduction mechanism.

In Step S130, the UE selects, based on macro cell uplink resources, to camp on a macro cell or to access a small cell controlled by a plurality of road side units (RSUs).

In Step S130, the UE may change a mobility state management and a cell selection and handover function, and may select to access the small cell controlled by the RSUs.

In Step S140, the UE reports current location information through the X2 interface between the RSUs and through the X2 interface between the RSU and the base station.

In this embodiment of the present disclosure, alternatively, when the base station does not indicate the uplink signaling reduction mechanism in the first RRC signaling or the second RRC signaling, the UE selects to establish an RRC connection with the macro cell or the small cell controlled by the RSUs based on the mobility state maintenance and the cell selection and handover function.

According to the technical solution of processing control plane signaling disclosed by the embodiment of the present disclosure, when the base station indicates the uplink signaling reduction mechanism in the first RRC signaling or the second RRC signaling, the UE enables the uplink signaling reduction mechanism, selects, based on macro cell uplink resources, to camp on a macro cell or to access a small cell controlled by the RSUs, and reports the current location information through the X2 interfaces between the RSUs and through the X2 interfaces between the RSUs and the base station. According to the technical solution disclosed by the present disclosure, the base station has an uplink signaling reduction mechanism. By way of enabling-disabling the uplink signaling reduction mechanism by the base station, when the base station indicates the uplink signaling reduction mechanism in system information broadcast or other RRC signaling, the UE enables the uplink signaling reduction mechanism, such that the UE preferentially selects to camp on a macro cell or to access a small cell controlled by RSUs to save macro cell uplink resources. Further, the UE offloads the uplink report signaling from an air interface by way of a collaboration between the RSUs or a collaboration between the RSU and the base station during a handoff process, and transfers the report signaling to a RSU layer, which does not occupy macro network resources and reduces control plane signaling overheads, and thus the objective of increasing the overall utilization of radio resources is achieved.

In this embodiment of the present disclosure, behaviors of the UE in an idle state and in a connected state are enhanced, such that the UE preferentially selects to camp on or access a small cell controlled by the RSUs to save macro cell uplink resources. For the UE in the idle state, the effect of the base station on introduction of the uplink signaling reduction mechanism may be reduced by planning a tracking area (TA) and configuring a tracking area identifier list (TAI list). For the UE in the connected state, the report signaling is transferred to the RSU layer, which does not occupy macro network resources. Moreover, a corresponding solution of not losing location report information during the handoff process is also proposed.

When the UE is in an idle state, a cell reselection frequency may increase, and thus in the technical solution of the present disclosure, alternatively, the base station plans the TA of the base station, and the RSU plans the TA of the RSU, such that a tracking area update (TAU) of the macro cell and a TAU of the RSU are the same.

When the TA of the macro cell is different from that of the RSU, the TA of the base station and the TA of the RSU are configured into the TAI list of the UE.

At this moment, the UE in the idle state receives the TAI list allocated by the base station and the RSU to the UE. In this embodiment of the present disclosure, the TAU frequency of the UE may be reduced by reasonably planning the TA and by reasonably configuring the TAI list.

When the UE is in the connected state, the UE may report the current location information through the RSU, and may report the current location information of the UE to the base station through the X2 interface between the base station and the RSU, thereby avoiding occupancy of the uplink signaling of the base station.

When the UE is the UE in the connected state, the handover frequency is small for the UE in a low mobility state, and thus less loss is caused in reporting the current location information.

For the UE in a medium mobility state or the UE in a high mobility state, the UE handoffs between small cells controlled by the RSUs may be relatively frequent. Thus, to alleviate the problem of frequent handoff, in this embodiment of the present disclosure, alternatively, the current location information is reported through the X2 interface between the first RSU and the second RSU when the UE switches between a road area covered by the first RSU and a road area covered by the second RSU.

In this embodiment of the present disclosure, based on handoff between the road areas covered by the RSUs, on one hand, when the handoff occurs frequently, the caused signaling overhead exists between the UE and the RSU but does not depend on the base station; and on the other hand, the UE may use a pre-configured resource pool or an abnormal resource pool, or use effective resources or resource pools between multiple RSUs to carry out V2X information transmission, which may still achieve the objective of saving the uplink report signaling overhead.

It is to be noted that the RSU has many types of antenna coverage modes such as omnidirectional coverage or linear coverage. The RSU selects an antenna direction in case of the linear coverage to obtain a strip-shaped road area with an expanded coverage range.

When handoff is involved in the embodiment of the present disclosure, to ensure an uninterrupted transmission without occupying macro network radio resources when the UE reports the current location information during the handoff, in this embodiment of the present disclosure, alternatively, the method further includes:

saving the current location information in the UE when the current location information of the UE is obtained under the first RSU; and reporting the current location information saved in the UE through the X2 interface between the first RSU and the second RSU when the UE establishes an RRC connection with the second RSU.

It is to be noted that the current location information saved in the UE may serve as a part of history information IE of the UE.

When handoff is involved in the embodiment of the present disclosure, to ensure an uninterrupted transmission without occupying macro network radio resources when the UE reports the current location information during the handoff, in this embodiment of the present disclosure, alternatively, the method further includes:

reporting the current location information saved in the UE through the X2 interface between the first RSU and the second RSU before the connection between the UE and the first RSU is disconnected.

When handoff is involved in the embodiment of the present disclosure, to ensure an uninterrupted transmission without occupying macro network radio resources when the UE reports the current location information during the handoff, in this embodiment of the present disclosure, alternatively, the method further includes:

broadcasting the current location information in a broadcast manner.

The first RSU and the second RSU are each provided with a PC5 interface. After the current location information saved in the UE is received, the current location information is reported through the X2 interface between the RSU and the base station.

In any one of the above embodiments of the present disclosure, alternatively, the method further includes:

The UE reports a cell identity (cell ID) of a previous RSU and/or a cell ID of a selected RSU to the base station through the X2 interface between the RSU and the base station when a global navigation satellite system (GNSS) of the UE or other positioning information is invalidated in a handoff process. The cell ID of the RSU herein also may be a small cell ID of the RSU.

The cell ID of the previous RSU and/or the cell ID of the selected RSU are reported to the base station to serve as coarse-grained location information. The UE also may simultaneously report cell IDs of multiple RSUs, which can allow the base station to more accurately determine the location of the UE to support resource allocation.

It is to be noted that the "first" and "second" in the embodiments of the present disclosure are merely intended for differentiating the same type of devices or apparatuses.

According to the technical solution of processing control plane signaling disclosed by the embodiment of the present disclosure, when the base station indicates the uplink signaling reduction mechanism in the system information broadcast or other RRC signaling, the UE enables the uplink signaling reduction mechanism, selects, based on macro cell uplink resources, to camp on a macro cell or to access a small cell controlled by the RSUs, and reports the current location information through the X2 interfaces between the RSUs and through the X2 interfaces between the RSU and the base station. The technical solution disclosed by the present disclosure introduces an uplink signaling reduction mechanism indicated by a base station. By way of enabling-disabling control of the uplink signaling reduction mechanism by the base station, when the base station indicates the uplink signaling reduction mechanism in system information broadcast or other RRC signaling, the UE enables the uplink signaling reduction mechanism, such that the UE preferentially selects to camp on a macro cell or to access a small cell controlled by RSUs to save macro cell uplink resources. The UE offloads the uplink report signaling from an air interface by way of a collaboration between the RSUs and a collaboration between the RSU and the base station during a handoff process, and transfers the report signaling to a RSU layer, which does not occupy macro network resources and reduces control plane signaling overheads, and thus the objective of increasing the overall utilization of radio resources is achieved.

Embodiment II

Embodiment II of the present disclosure correspondingly discloses a device for processing uplink control plane signaling for V2X services, and a terminal applicable to the device for processing uplink control plane signaling for V2X services.

Figure 3:
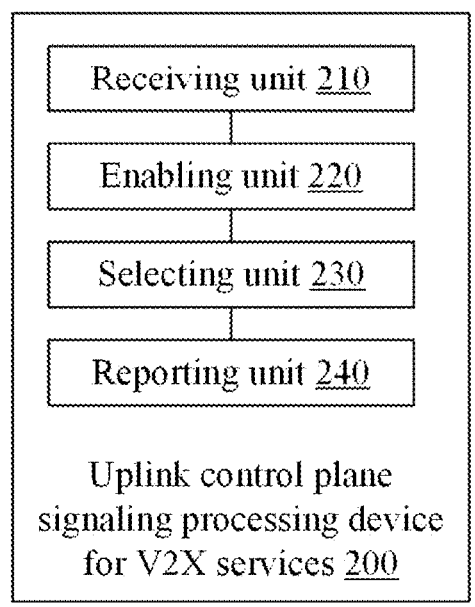
FIG. 3 illustrates a schematic block diagram of an uplink control plane signaling processing device 200 for V2X services according to Embodiment II of the present disclosure.

A schematic block diagram of the device 200 for processing uplink control plane signaling for V2X services according to the embodiment of the present disclosure is as shown in FIG. 3. The device 200 includes: a receiving unit 210, an enabling unit 220, a selecting unit 230, and a reporting unit 240.

The receiving unit 210 is configured to receive an uplink signaling reduction mechanism indicated by the base station in system information broadcast or other radio resource control (RRC) signaling.

The enabling unit 220 is configured to enable the uplink signaling reduction mechanism.

The selecting unit 230 is configured to select, based on macro cell uplink resources, to camp on a macro cell or to access a small cell controlled by a plurality of road side units (RSUs).

The reporting unit 240 is configured to report current location information through X2 interfaces between the RSUs and through an X2 interface between the RSU and the base station.

In this embodiment of the present disclosure, alternatively, when the UE is in an idle state, the base station eNB plans a tracking area (TA) of the base station eNB, and the RSU plans a TA of the RSU, such that a tracking area update (TAU) of the macro cell and a TAU of the RSU are the same. When the TA of the macro cell is different from that of the RSU, both the TA configured by the base station to the macro cell and the TA configured by the RSU to the RSU are configured into the TAI list of the UE.

The receiving unit is configured to receive the TAI list of the UE configured by the base station and the RSU.

In this embodiment of the present disclosure, alternatively, when the UE is in a connected state, the reporting unit includes:

a first reporting subunit, configured to report the current location information through an X2 interface between a first RSU and a second RSU when the UE switches between a road area covered by the first RSU and a road area covered by the second RSU.

Figure 4:
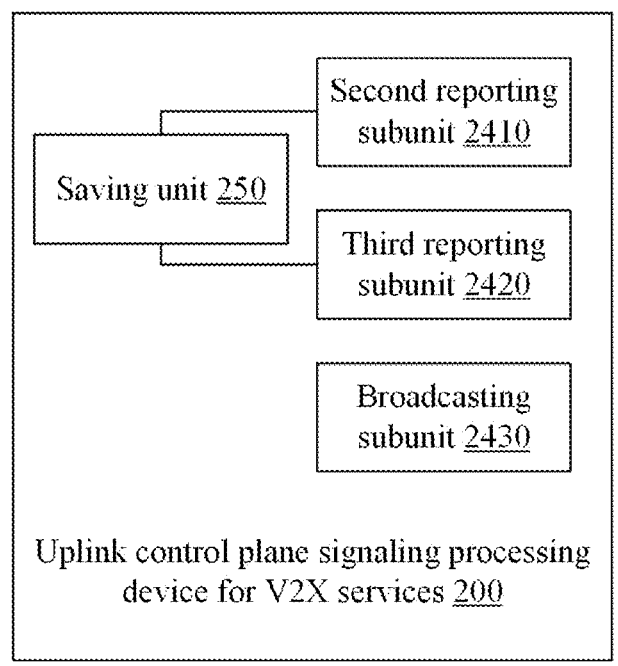
FIG. 4 illustrates a schematic partial block diagram of another uplink control plane signaling processing device 200 for V2X services according to Embodiment II of the present disclosure.

As shown in FIG. 4, in this embodiment of the present disclosure, alternatively, the device 200 for processing uplink control plane signaling for V2X services further includes: a saving unit 250.

The saving unit 250 is configured to save the current location information of the UE in the UE when the current location information of the UE is obtained under the first RSU.

The reporting unit includes a second reporting subunit 2410, which is configured to report the current location information saved in the UE through the X2 interface between the first RSU and the second RSU when the UE establishes an RRC connection with the second RSU.

Alternatively,

The reporting unit includes a third reporting subunit 2420, which is configured to report the current location information saved in the UE through the X2 interface between the first RSU and the second RSU before the connection between the UE and the first RSU is disconnected.

Alternatively,

The reporting unit includes a broadcasting subunit 2430, which is configured to broadcast the current location information in a broadcast manner. The first RSU and the second RSU are each provided with a PC5 interface, and after the current location information saved in the UE is received, the current location information is reported through the X2 interface between the RSU and the base station eNB.

In this embodiment of the present disclosure, alternatively, the reporting unit further includes a fourth reporting subunit, which is configured to report a cell identity (cell ID) of a previous RSU and/or a cell ID of a selected RSU to the base station eNB through the X2 interface between the RSU and the base station eNB when a global navigation satellite system (GNSS) of the UE or other positioning information is invalidated in a handoff process.

Embodiment III

Embodiment III of the present disclosure further provides a non-transitory computer readable storage medium, which stores computer-executable instructions. The computer-executable instructions are used for executing the uplink control plane signaling processing method for V2X services according to any one of the above embodiments.

Embodiment IV

Figure 5:
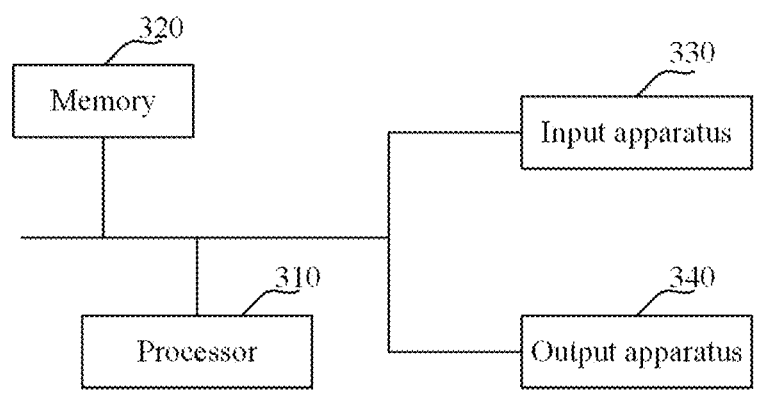
FIG. 5 illustrates a schematic diagram of a hardware configuration of a user equipment according to Embodiment IV of the present disclosure.

Embodiment IV of the present disclosure discloses a schematic diagram of a hardware configuration of a user equipment. As shown in FIG. 5, the user equipment includes:

one or more processors 310, in FIG. 5 one processor 310 being taken as an example; and a memory 320.

The user equipment may further include an input apparatus 330 and an output apparatus 340.

The processor 310, the memory 320, the input apparatus 330 and the output apparatus 340 in the device may be connected by means of a bus or in other ways, in FIG. 5 connecting by means of a bus is taken as an example.

As a non-transitory computer readable storage medium, the memory 320 may be configured to store software programs, computer executable programs and modules such as program instructions/modules (for example, the receiving unit 210, the enabling unit 220, the selecting unit 230, and the reporting unit 240 as shown in FIG. 3) corresponding to the method for processing uplink control plane signaling for V2X services in the embodiments of the present disclosure. The processor 310 may execute various function applications and data processing of a server, namely implement the method for processing uplink control plane signaling for V2X services in the foregoing method embodiments by running the software programs, instructions and modules stored in the memory 320.

The memory 320 may include a program storage area and a data storage area. The program storage area may store an operating system, and application programs required for at least one function. The data storage area may store data created according to the use of a terminal device. Moreover, the memory 320 may include a high speed random access memory, or may further include a non-volatile memory, for example, at least one magnetic disk storage device, a flash memory, or other non-volatile solid-state storage devices. In some embodiments, the memory 320 may optionally include memories disposed remotely relative to the processor 320, and these remote memories may be connected to a terminal device via the network. Instances of the foregoing network includes but is not limited to the Internet, the Intranet, a local area network (LAN), a mobile communication network and a combination thereof.

The input apparatus 330 may be configured to receive inputted numerical or character information to generate key signal inputs related to user settings and function control a terminal. The output apparatus 340 may include a display device such as a display screen, etc.

The one or more modules are stored in the memory 320, and when they are executed by the one or more processors 310, the method for processing uplink control plane signaling for V2X services in the foregoing method embodiments is executed.

The technical solution of the present disclosure is described in detail with reference to the accompanying drawings. The present disclosure provides a technical solution for processing uplink control plane signaling for V2X services. By introducing an indicating mechanism of an uplink signaling reduction at the base station, the UE preferentially selects to camp on a macro cell or to access a small cell controlled by RSUs to save macro cell uplink resources, and offloads the uplink report signaling from an air interface by way of the collaboration between the RSUs and the collaboration between the RSU and the base station, which reduces control plane signaling overheads, and thus the objective of increasing the overall utilization of radio resources is achieved.

The above are merely preferred embodiments of the present disclosure and are not intended to limit the present disclosure. To those skilled in the art, the present disclosure may have various modifications and changes.

INDUSTRIAL APPLICABILITY

According to the embodiments of the present disclosure, by introducing a mechanism of indicating the uplink signaling reduction mechanism by the base station, the UE preferentially selects to camp on a macro cell or to access a small cell controlled by RSUs to save macro cell uplink resources, and offloads the uplink report signaling from an air interface by way of the collaboration between the RSUs and the collaboration between the RSU and the base station, which reduces control plane signaling overheads, and thus the overall utilization of radio resources is increased.

What is claimed is:

1. An uplink control plane signaling processing method for Vehicle to X (V2X) services, the method being applicable to a User Equipment (UE) and comprising:
receiving first radio resource control (RRC) signaling or second RRC signaling from a base station, wherein the first RRC signaling is a system information broadcast;
in response to an uplink signaling reduction mechanism being indicated in the first RRC signaling or the second RRC signaling, enabling the uplink signaling reduction mechanism;
selecting, based on macro cell uplink resources, to camp on a macro cell or to access a small cell controlled by a plurality of road side units (RSUs);
reporting current location information through an X2 interface between the plurality of RSUs and through an X2 interface between the RSU and the base station, and
in response to the uplink signaling reduction mechanism not being indicated in the first RRC signaling or the second RRC signaling, selecting to establish an RRC connection with the macro cell or the small cell controlled by the RSUs based on a mobility state maintenance and a cell selection and handover function.

2. The method according to claim 1, wherein when the UE is in an idle state, the base station plans a tracking area (TA) thereof, and each of the plurality of RSUs plans a TA thereof, such that wherein a tracking area update (TAU) of the macro cell and a TAU of the plurality of RSUs are the same; and when a TA of the macro cell is different from TAs of the plurality of RSUs, the method further comprises:

receiving, by the UE, a tracking area identifier list (TAI list) configured by the base station and the RSUs to the UE;
wherein the TAI list of the UE comprises the TA configured by the base station to the macro cell and the TAs configured by the RSUs to the RSUs, and the TA of the macro cell is different from the TAs of the RSUs.

3. The method according to claim 1, further comprising:
reporting the current location information through an X2 interface between a first RSU and a second RSU when the UE is in a connected state and the UE switches between a road area covered by the first RSU and a road area covered by the second RSU.

4. The method according to claim 3, further comprising:
saving the current location information of the UE in the UE when the current location information of the UE is obtained under the first RSU; and
one of the following steps:
reporting the current location information saved in the UE through the X2 interface between the first RSU and the second RSU when the UE establishes an RRC connection with the second RSU; or
reporting the current location information saved in the UE through the X2 interface between the first RSU and the second RSU before the UE is disconnected from the first RSU; or
broadcasting the current location information, wherein the first RSU and the second RSU are each configured with a PC5 interface, and after the current location information saved in the UE is received, the current location information is reported through the X2 interface between the RSU and the base station.

5. The method according to claim 1, further comprising:
reporting a cell identity (cell ID) of a previous RSU and/or a cell ID of a selected RSU to the base station through the X2 interface between the RSU and the base station when a global navigation satellite system (GNSS) of the UE or other positioning information is invalidated in a handoff process.

6. A non-transitory computer readable storage medium, storing computer-executable instructions, wherein the computer-executable instructions are used for executing an uplink control plane signaling processing method for Vehicle to X (V2X) services wherein the uplink control plane signaling processing method for V2X services comprises:
receiving first radio resource control (RRC) signaling or second RRC signaling from a base station, wherein the first RRC signaling is a system information broadcast;
in response to an uplink signaling reduction mechanism being indicated in the first RRC signaling or the second RRC signaling, enabling the uplink signaling reduction mechanism;
selecting, based on macro cell uplink resources, to camp on a macro cell or to access a small cell controlled by a plurality of road side units (RSUs);
reporting current location information through an X2 interface between the plurality of RSUs and through an X2 interface between the RSU and the base station, and
in response to the uplink signaling reduction mechanism not being indicated in the first RRC signaling or the second RRC signaling, selecting to establish an RRC connection with the macro cell or the small cell controlled by the RSUs based on a mobility state maintenance and a cell selection and handover function.

7. The non-transitory computer readable storage medium according to claim 6, wherein, when the UE is in an idle state, the base station plans a tracking area (TA) thereof, and each of the plurality of RSUs plans a TA thereof, wherein a tracking area update (TAU) of the macro cell and a TAU of the plurality of RSUs are the same; and when a TA of the macro cell is different from TAs of the plurality of RSUs, the uplink control plane signaling processing method for V2X services further comprises:

receiving, by the UE, a tracking area identifier list (TAI list) configured by the base station and the RSUs to the UE;

wherein the TAI list of the UE comprises the TA configured by the base station to the macro cell and the TAs configured by the RSUs to the RSUs, and the TA of the macro cell is different from the TAs of the RSUs.

8. The non-transitory computer readable storage medium according to claim 6, wherein the uplink control plane signaling processing method for V2X services further comprises:

reporting the current location information through an X2 interface between a first RSU and a second RSU when the UE is in a connected state and the UE switches between a road area covered by the first RSU and a road area covered by the second RSU.

9. The non-transitory computer readable storage medium according to claim 8, wherein the uplink control plane signaling processing method for V2X services further comprises:

saving the current location information of the UE in the UE when the current location information of the UE is obtained under the first RSU; and one of the following steps:

reporting the current location information saved in the UE through the X2 interface between the first RSU and the second RSU when the UE establishes an RRC connection with the second RSU; or reporting the current location information saved in the UE through the X2 interface between the first RSU and the second RSU before the UE is disconnected from the first RSU; or broadcasting the current location information, wherein the first RSU and the second RSU are each configured with a PC5 interface, and after the current location information saved in the UE is received, the current location information is reported through the X2 interface between the RSU and the base station.

10. The non-transitory computer readable storage medium according to claim 6, wherein the uplink control plane signaling processing method for V2X services further comprises: reporting a cell identity (cell ID) of a previous RSU and/or a cell ID of a selected RSU to the base station through the X2 interface between the RSU and the base station when a global navigation satellite system (GNSS) of the UE or other positioning information is invalidated in a handoff process.

11. A terminal, comprising:

at least one processor; and a memory communicably connected with the at least one processor and configured for storing computer-executable instruction executable by the at least one processor;

wherein the computer-executable instructions when executed by the at least one processor causes the at least one processor to perform an uplink control plane signaling processing method for V2X services, wherein the uplink control plane signaling processing method for V2X services comprises:

receiving first radio resource control (RRC) signaling or second RRC signaling from a base station, wherein the first RRC signaling is a system information broadcast;

in response to an uplink signaling reduction mechanism being indicated in the first RRC signaling or the second RRC signaling, enabling the uplink signaling reduction mechanism;

selecting, based on macro cell uplink resources, to camp on a macro cell or to access a small cell controlled by a plurality of road side units (RSUs);

reporting current location information through an X2 interface between the plurality of RSUs and through an X2 interface between the RSU and the base station, and in response to the uplink signaling reduction mechanism not being indicated in the first RRC signaling or the second RRC signaling, selecting to establish an RRC connection with the macro cell or the small cell controlled by the RSUs based on a mobility state maintenance and a cell selection and handover function.

12. The terminal according to claim 11, wherein, when the UE is in an idle state, the base station plans a tracking area (TA) thereof, and each of the plurality of RSUs plans a TA thereof, wherein a tracking area update (TAU) of the macro cell and a TAU of the plurality of RSUs are the same; and when a TA of the macro cell is different from TAs of the plurality of RSUs, the uplink control plane signaling processing method for V2X services further comprises:

receiving, by the UE, a tracking area identifier list (TAI list) configured by the base station and the RSUs to the UE;

wherein the TAI list of the UE comprises the TA configured by the base station to the macro cell and the TAs configured by the RSUs to the RSUs, and the TA of the macro cell is different from the TAs of the RSUs.

13. The terminal according to claim 11, wherein the uplink control plane signaling processing method for V2X services further comprises:

reporting the current location information through an X2 interface between a first RSU and a second RSU when the UE is in a connected state and the UE switches between a road area covered by the first RSU and a road area covered by the second RSU.

14. The terminal according to claim 13, wherein the uplink control plane signaling processing method for V2X services further comprises:

saving the current location information of the UE in the UE when the current location information of the UE is obtained under the first RSU; and one of the following steps:

reporting the current location information saved in the UE through the X2 interface between the first RSU and the second RSU when the UE establishes an RRC connection with the second RSU; or reporting the current location information saved in the UE through the X2 interface between the first RSU and the second RSU before the UE is disconnected from the first RSU; or broadcasting the current location information, wherein the first RSU and the second RSU are each configured with a PC5 interface, and after the current location information saved in the UE is received, the current location information is reported through the X2 interface between the RSU and the base station.

15. The terminal according to claim 11, wherein the uplink control plane signaling processing method for V2X services further comprises: reporting a cell identity (cell ID) of a previous RSU and/or a cell ID of a selected RSU to the base station through the X2 interface between the RSU and the base station when a global navigation satellite system (GNSS) of the UE or other positioning information is invalidated in a handoff process.

\* \* \* \* \*